United States Patent [19]
Kikinis

[11] Patent Number: 5,790,100
[45] Date of Patent: Aug. 4, 1998

[54] BROADCAST POINTER DEVICE WITH ADD-ON SLEEVE

[75] Inventor: Dan Kikinis, Sunnyvale, Calif.

[73] Assignee: Elonex I. P. Holdings, Ltd., London, United Kingdom

[21] Appl. No.: 573,627

[22] Filed: Dec. 18, 1995

Related U.S. Application Data

[63] Continuation-in-part of Ser. No. 209,539, Mar. 11, 1994, abandoned.
[51] Int. Cl.$^6$ ........................................ G09B 5/08
[52] U.S. Cl. ........................ 345/158; 345/15; 345/156
[58] Field of Search ........................... 345/163, 156, 345/157, 158, 168, 169, 173, 179; 178/18, 19; 341/22, 32; 361/680

[56] References Cited

U.S. PATENT DOCUMENTS

| | | | |
|---|---|---|---|
| 4,754,268 | 6/1988 | Mori | 345/163 |
| 4,777,329 | 10/1988 | Mallicoat | 345/179 |
| 4,959,721 | 9/1990 | Micic et al. | 345/158 |
| 5,453,759 | 9/1995 | Seeback | 345/179 |

Primary Examiner—Doom-Doom Chow
Attorney, Agent, or Firm—Donald R. Boys

[57] ABSTRACT

A general-purpose computer has a compartment for storing a pointer. device such as a mouse or a trackball, such that the may be removed from the compartment and deployed for use. The device may be a mouse. a trackball, or other type. and may communicate with the host computer by a cable. an infra-red system. ar by an inductively coupled system. In one embodiment the computer has a broadcast pointer system. and the device includes any conventional writing instrument or stylus. fitted with an echo device encapsulated in a body having an engagement element for mounting the echo device to the conventional writing instrument or stylus.

6 Claims, 19 Drawing Sheets

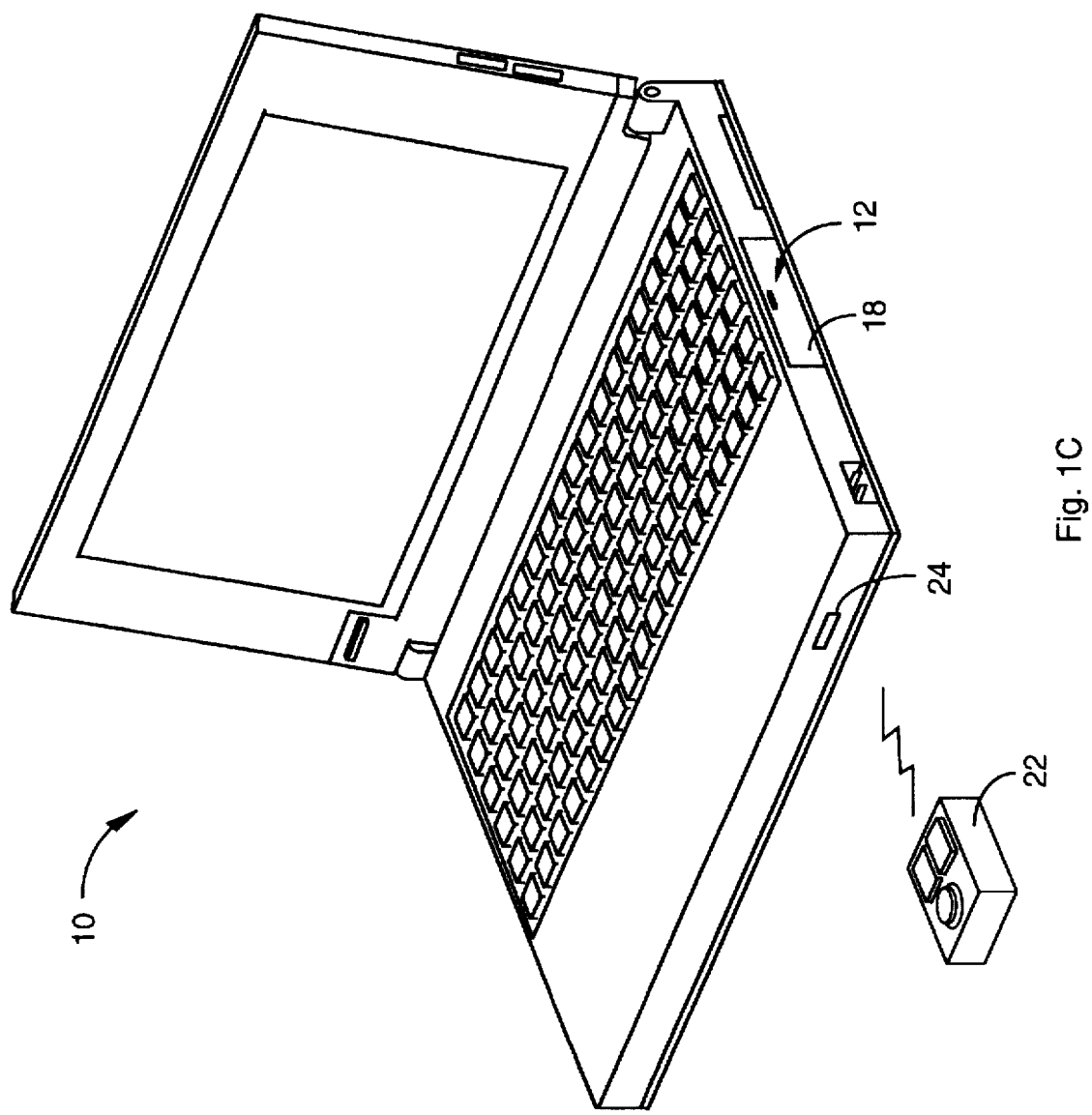

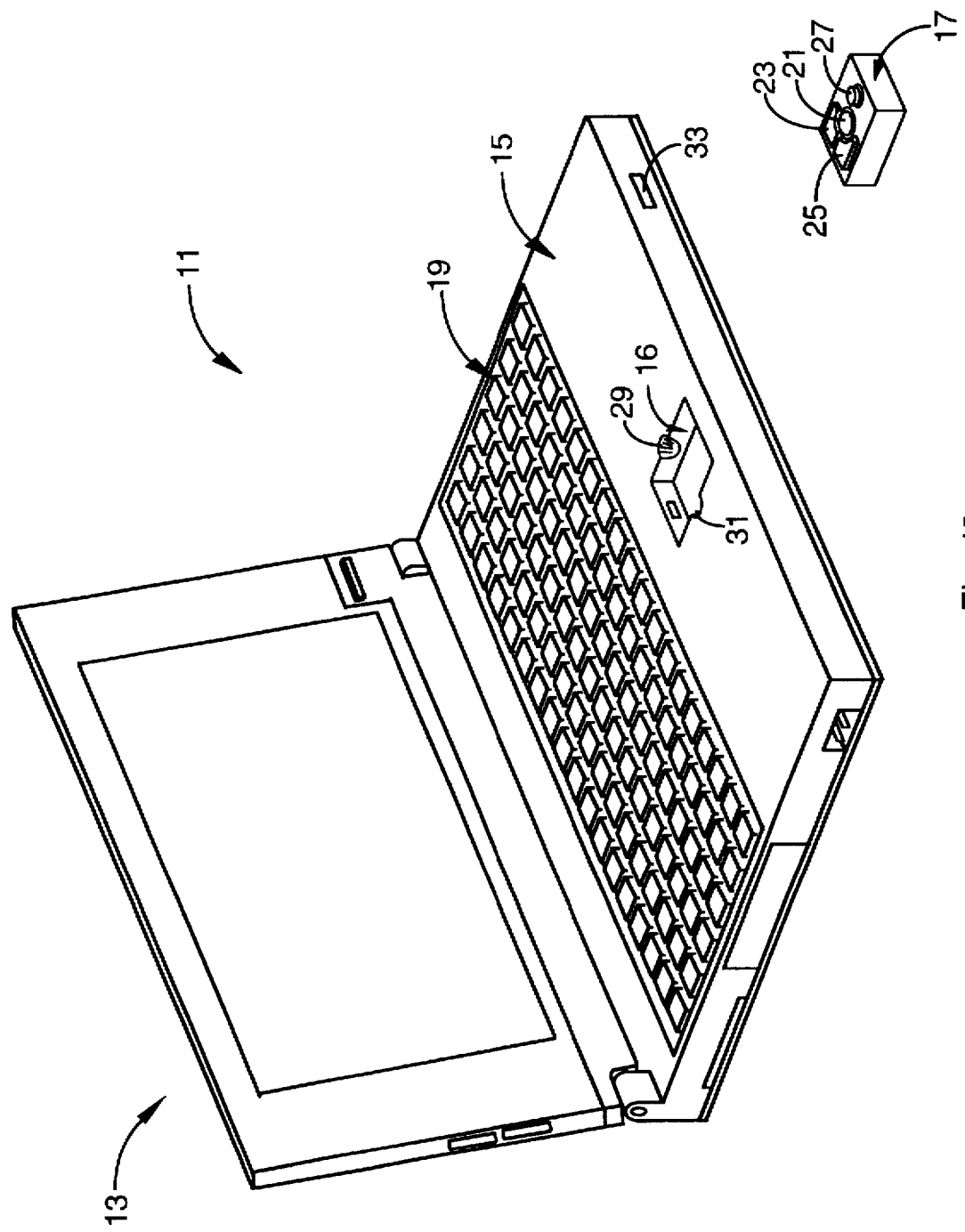

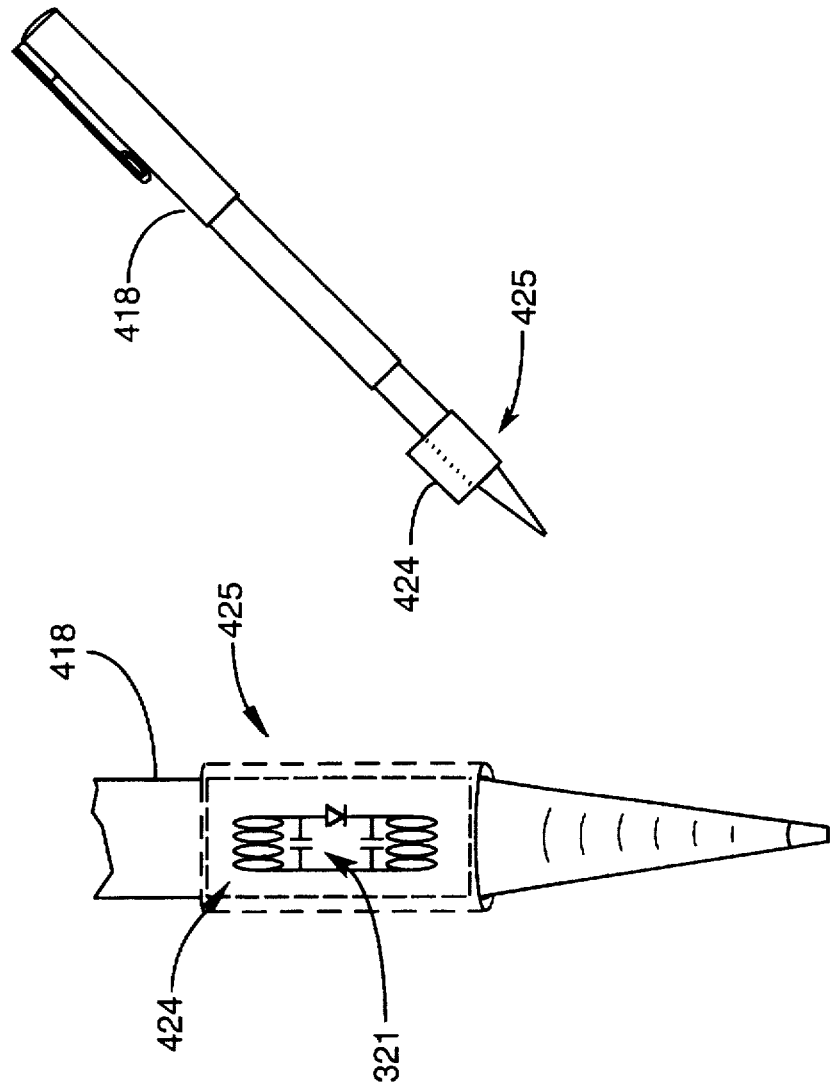
Fig. 7G
Fig. 7F
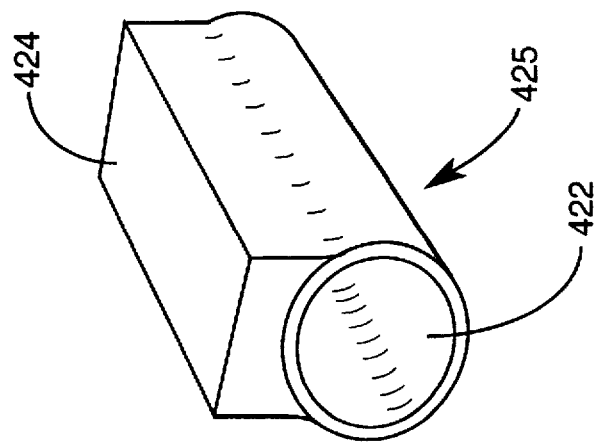
Fig. 7E

BROADCAST POINTER DEVICE WITH ADD-ON SLEEVE

CROSS-REFERENCE TO RELATED DOCUMENTS

This application is a continuation-in-part of application Ser. No. 08/209,539 now abandoned, filed Mar. 11, 1994 which is incorporated herein in its entirety by reference.

BACKGROUND OF THE INVENTION

The present invention is in the area of desktop peripheral I/O devices for personal computers and pertains more specifically to pointer devices.

BACKGROUND OF THE INVENTION

In the 1960s a hand-held pointer device, dubbed a "mouse", was introduced to provide a fast and intuitively simple means of information retrieval from menu-driven, on-screen computer user interfaces. Physical movement of the mouse over a flat surface causes a corresponding movement of a cursor on the host computer screen. A button on top of the mouse allowed the user to select menu items. The mouse rapidly became a basic component of personal computer hardware configurations, allowing users to bypass more tedious keyboard input. Today there is an ever-expanding array of different styles of mice, including cordless mice, an upside-down type of mouse, known as a trackball, and others. These devices are generally known now as pointer devices.

To provide flexibility, cordless communication has been developed for pointer devices, such as mice. A cordless mouse typically sends signals to a receiver attached to a computer's serial port or bus. The transmission medium may be low-power infrared or radio signals, among others. Magnetic induction is also a known communication medium between a pointer device and host.

Advancements in computer technology provide an ever-increasing variety of external peripheral devices. This may be desirable, but work areas have become cluttered with numerous devices such as pointers, remote control units, microphones, audio recorders/players, and speakers. Travellers with portable computers are even more encumbered as they wrestle with an unwieldy quantity of peripheral equipment and cables when setting up an office away from home.

With the advent of portable computers the idea of a built-in pointer devices was explored as a means of equipment consolidation. In recent years manufacturers have introduced portable computers with trackball pointers encased in the housings and permanently wired into the computer circuitry. Although such configurations have reduced the number of separate components, pointer device operation is still constrained. Built-in pointer devices cannot be lifted out and used freely as desktop or hand-held units, and users are denied freedom of cordless movement unless they have a separate cordless pointer device with a separate remote receiving unit.

What is needed is an apparatus and method that allows users the flexibility to conveniently store any one of a wide variety of pointer devices in a compartment in a portable computer housing, and to remove the pointer from the compartment for use in a desktop or hand-held environment. Such a pointer device might optionally be operable both in its storage case and when removed. It could be a cordless or corded unit and preferably would have more than one mode of operation.

SUMMARY OF THE INVENTION

In an embodiment of the present invention a general-purpose computer is provided comprising a housing enclosing and supporting a CPU, memory, and a bus structure; a compartment in the housing configured for holding a removable pointer device; a pointer device having a user interface for providing positional input and configured for storing in the compartment; and a communication system coupling the pointer device to the computer, configured to pass positional input from the user interface to the computer.

In various embodiments the removable pointer device may take a number of forms, such as a trackball, a mouse, a polar coordinate input device deployable from a compartment, and a broadcast system wherein the location of a pointer is determined by radio transmissions and echo to a receiver in the host.

In various embodiments the pointer devices deployable from a compartment in the host may be connected by a cable to the host, or may be cordless, transmitting data to the host by such as infrared or variable magnetic field. In some embodiments the pointer may be used while docked in the on-board compartment, and communication while docked is by engagement of physical electrical connectors.

In another aspect of the invention a combination pointer device is provided having capabilities of both a trackball and a mouse pointer, and usable as either while removed from the docking well in the keyboard or the host enclosure. In the well the combination device is usable as a trackball.

In yet another embodiment a broadcast pointer device is provided having two transmitters and a receiver unit in the host computer, and merely an echo apparatus in or associated with a stylus, such that the computer can track the position of the stylus by transmitting to the echo apparatus and analyzing returned signals from the echo apparatus. In one such embodiment an echo device is provided in a small housing in a manner that the device can be attached to an existing pen, pencil, or stylus. In this embodiment a user may employ his or her preferred writing instrument, and the host can track movement of the instrument in substantially real time, and use the tracking data to control a cursor on a display monitor, and to perform other functions conventionally controlled by a pointer device.

The removable pointer device with a storage compartment in the host computer provides an extra degree of freedom and flexibility for pointer input, and addresses problems in the art of proliferation and complexity.

BRIEF DESCRIPTION OF THE DRAWINGS

FIG. 1C is an isometric view of a notebook-type computer with a cordless mouse device deployed for use.

FIG. 1I is an isometric view similar to FIG. 1H, showing the trackball pointer deployed for use away from the well.

FIG. 7E is an illustration of another broadcast pointer system with a sleeve-type deployable element.

FIG. 7F is an transparent illustration of the sleeve-type deployable element of FIG. 7E.

FIG. 7G is an illustration of the sleeve-type deployable element of FIGS. 7E and 7F on a writing instrument.

DESCRIPTION OF THE PREFERRED EMBODIMENTS

Figure 1A:
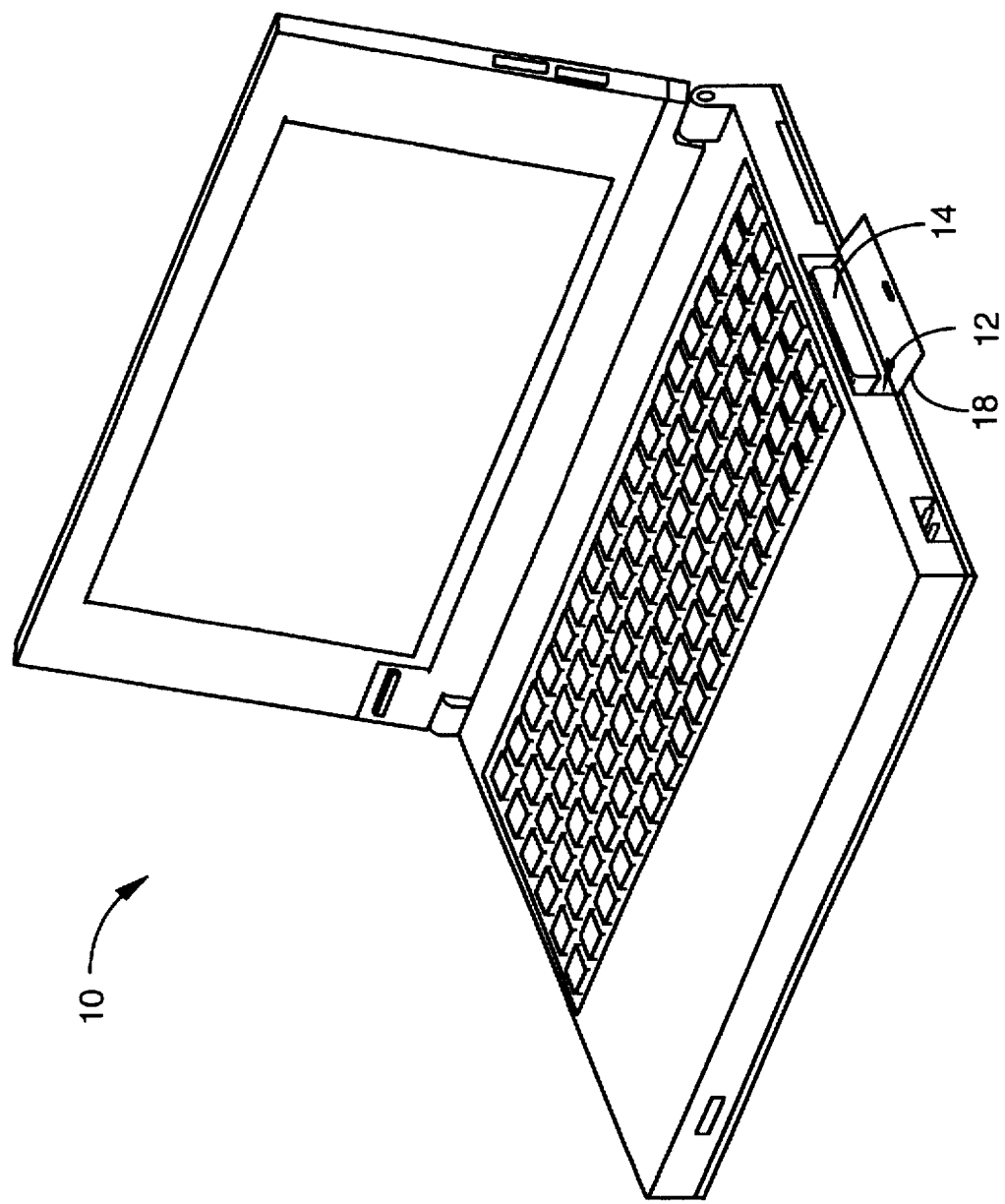
FIG. 1A is an isometric view of a notebook-type computer with a removable pointer device stored in an on-board compartment according to an embodiment of the present invention.

FIG. 1A is an isometric view of a notebook-type computer 10 with a compartment 12 having a closure 18, for scoring a pointer device 14 when the pointer is not needed. The compartment is shown on one side of the housing of the computer, but could as easily be located elsewhere and there a variety of ways the closure could be provided. The pointer may be any one of many sorts, such as joystick, trackball, or mouse device.

Figure 1B:
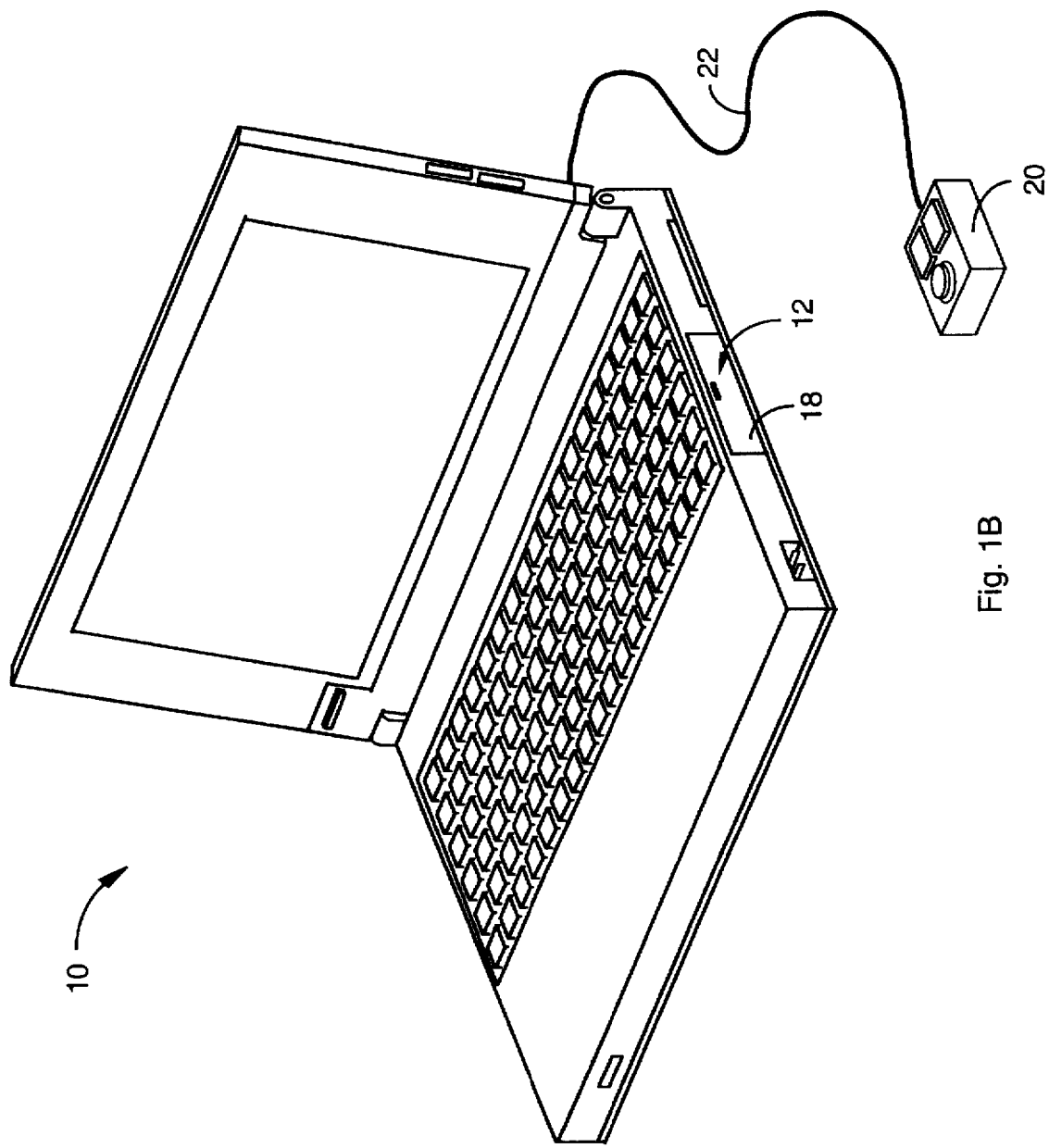
FIG. 1B is an isometric view of the notebook-type computer of FIG. 1A with a mouse pointer device deployed for use, having a connecting cable.

FIG. 1B is an isometric view similar to FIG. 1A showing a mouse-type pointer device 20 deployed for use from compartment 12, and connected to the host computer by a cable 22. The cable may be stored in this case in compartment 12 along with the pointer device. There are also alternative ways the cable might connect, such as at a parallel or a serial port on the host.

FIG. 1C is an isometric view of a notebook computer showing a cordless mouse device 22 storable in compartment 12 and deployed for use. There are several ways communication may be handled for the pointer device in this embodiment. In the embodiment of FIG. 1C the pointer has an infra-red transmitter and the host has an infra-red receiver 24.

Figure 1D:
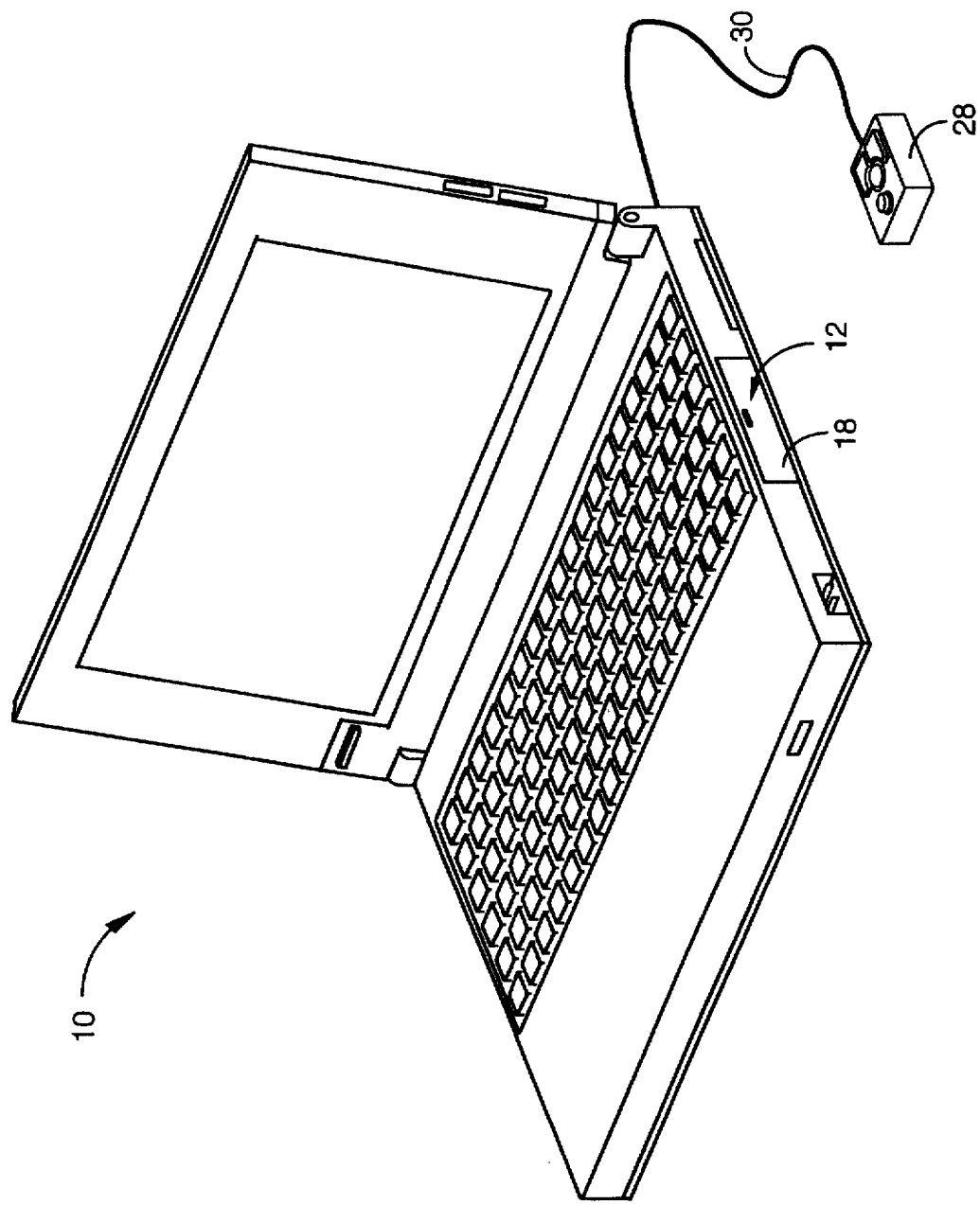
FIG. 1D is an isometric view of a notebook-type computer with a cord-connected trackball device deployed for use.

FIG. 1D is an isometric view of a notebook computer showing a trackball pointer device 28 connected to the host by a cable 30. The communication system in this case is the same as for a mouse-type device as described above.

Figure 1E:
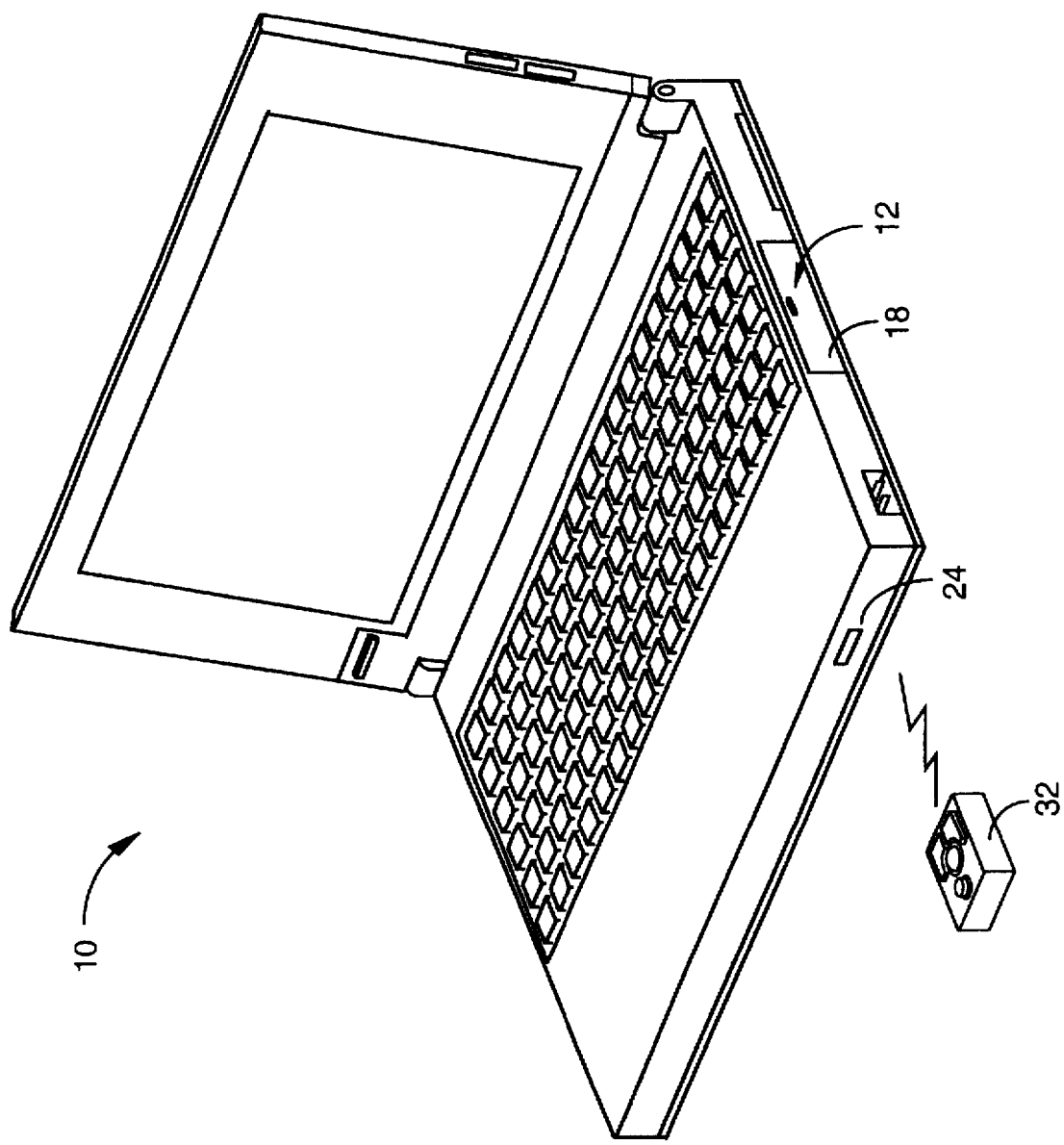
FIG. 1E is an isometric view of a notebook-type computer with a cordless trackball device deployed for use.

FIG. 1E is an isometric view of a notebook computer showing a cordless trackball device 32 deployed for use. The cordless trackball in this embodiment employs an infra-rad coded transmission system sending code according to trackball movement to receiver 24 at the host.

Figure 1F:
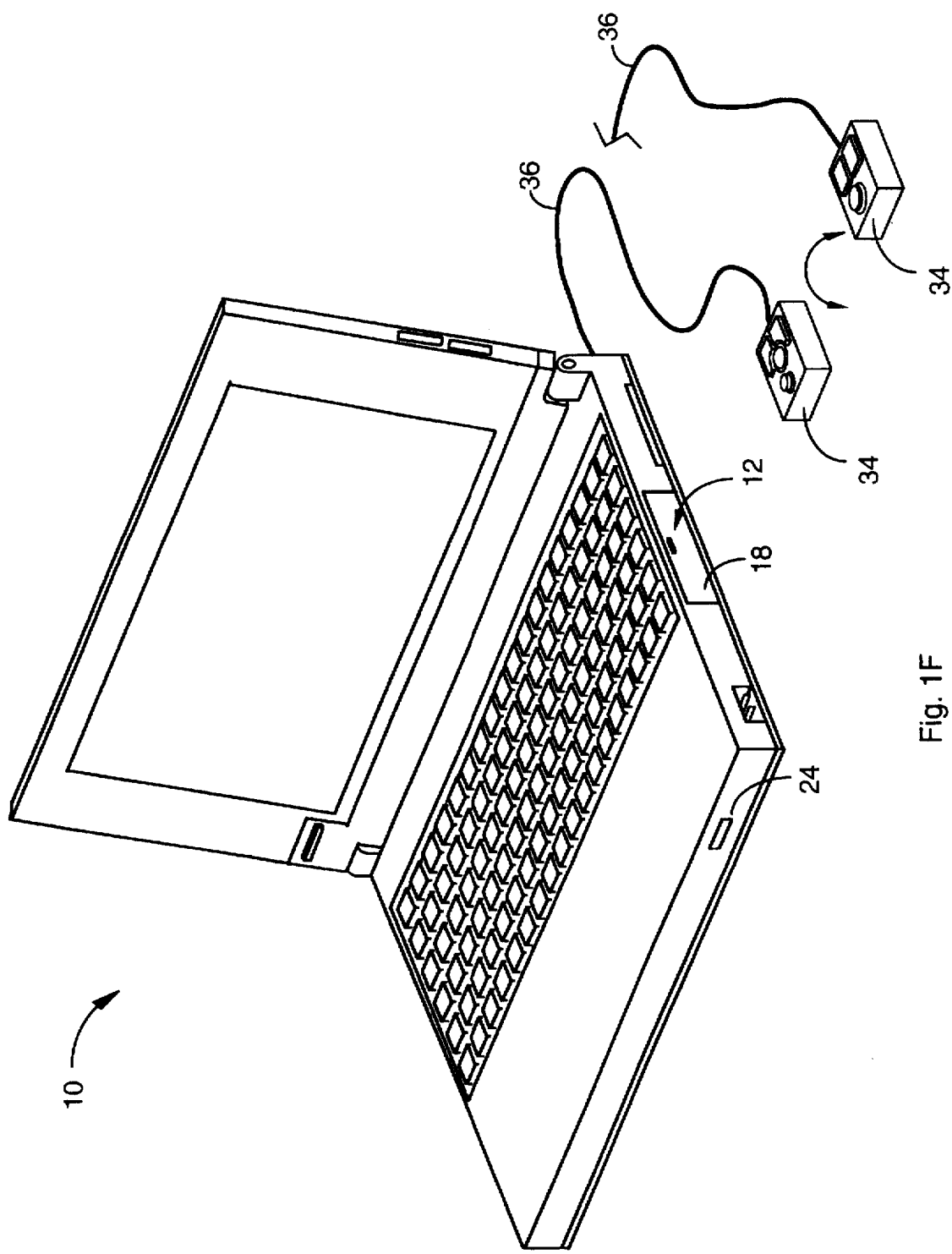
FIG. 1F is an isometric view of a notebook-type computer with a cord-connected combination mouse/trackball device deployed for use.

FIG. 1F is an isometric view of a notebook computer showing a combination pointer/trackball device 34 deployed for use and connected by a cable 36 to the host. This device is a combination device operable as a trackball in one orientation, and as a mouse device when inverted so the trackball may make contact with a flat surface. Further details of the combination are described below with reference to FIGS. 5 A–D.

Figure 1G:
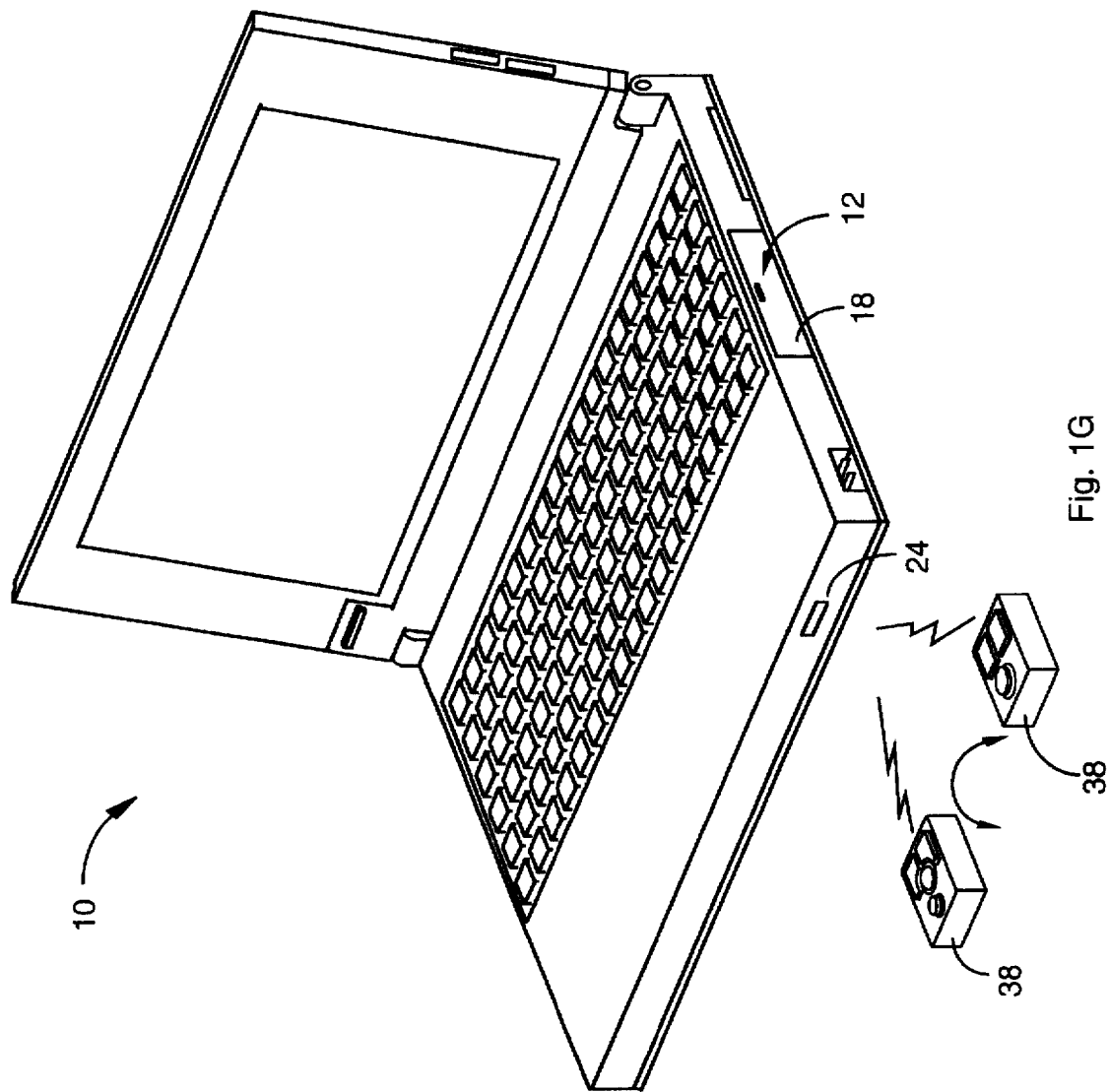
FIG. 1G is an isometric view of a notebook-type computer with a cordless combination mouse/trackball device deployed for use.

FIG. 1G is an isometric view of a notebook computer showing a combination trackball/pointer device 38 with cordless communication, and deployed from compartment 12 for use. In this case, the communication system is infra-red, and there is a receiver 24 on the host.

Figure 1H:
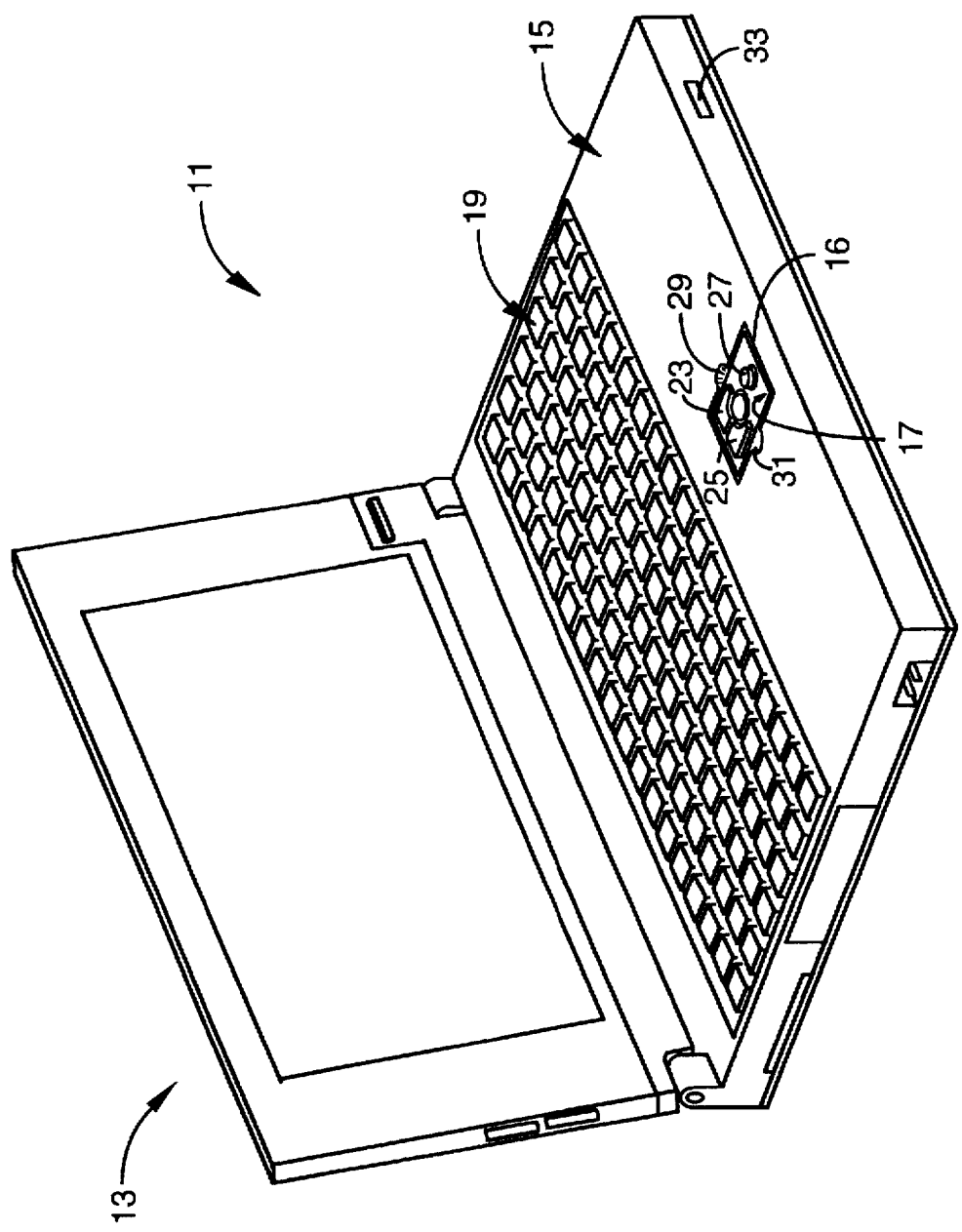
FIG. 1H is an isometric view of a notebook-type computer with a trackball pointer mounted in a well according to an embodiment of the present invention.

FIG. 1H is an isometric view of a general-purpose portable computer 11 with a removable pointer device 17 according to an embodiment of the present invention. Computer 11 comprises a housing 15 and a tilt-up display 13. The computer housing encloses standard electronic operating elements, such as a CPU microprocessor and system RAM, not shown in FIG. 1H. There are connectors (not shown) to serial devices and the like, which are typical for portable computers. A keyboard unit 19 provides a for user input. Removable pointer device 17, inset in well 16 in the housing, comprises a trackball design including a rotatable ball 21 to transmit directional information to the host, left and right control buttons 23 and 25 for discrete signalling, and a drag control button 27. The purpose of drag control button 27 is to signal that trackball movement is to be directed toward dragging an onscreen virtual object, a procedure well known in the art. Concave depressions 29 and 31 on opposite sides of well 16 allow space for a user to grasp the removable pointer device to snap it in and out of the well so it can be used as a separate unit.

The transmission medium between removable pointer and host in this embodiment is infrared, which is transmitted from a light-emitting diode (LED). Two photodiode receivers are imbedded in the computer housing, one in a wall of the well for stationary mode reception (not shown in FIG. 1H) and one receiver 33 in the front of the housing for portable mode reception. The photodiode receivers are connected with a common circuitry within the host computer.

FIG. 1I is an isometric view of computer 11 with pointer device 17 removed from the well in the housing, deployed for use external to the housing.

Figure 2:
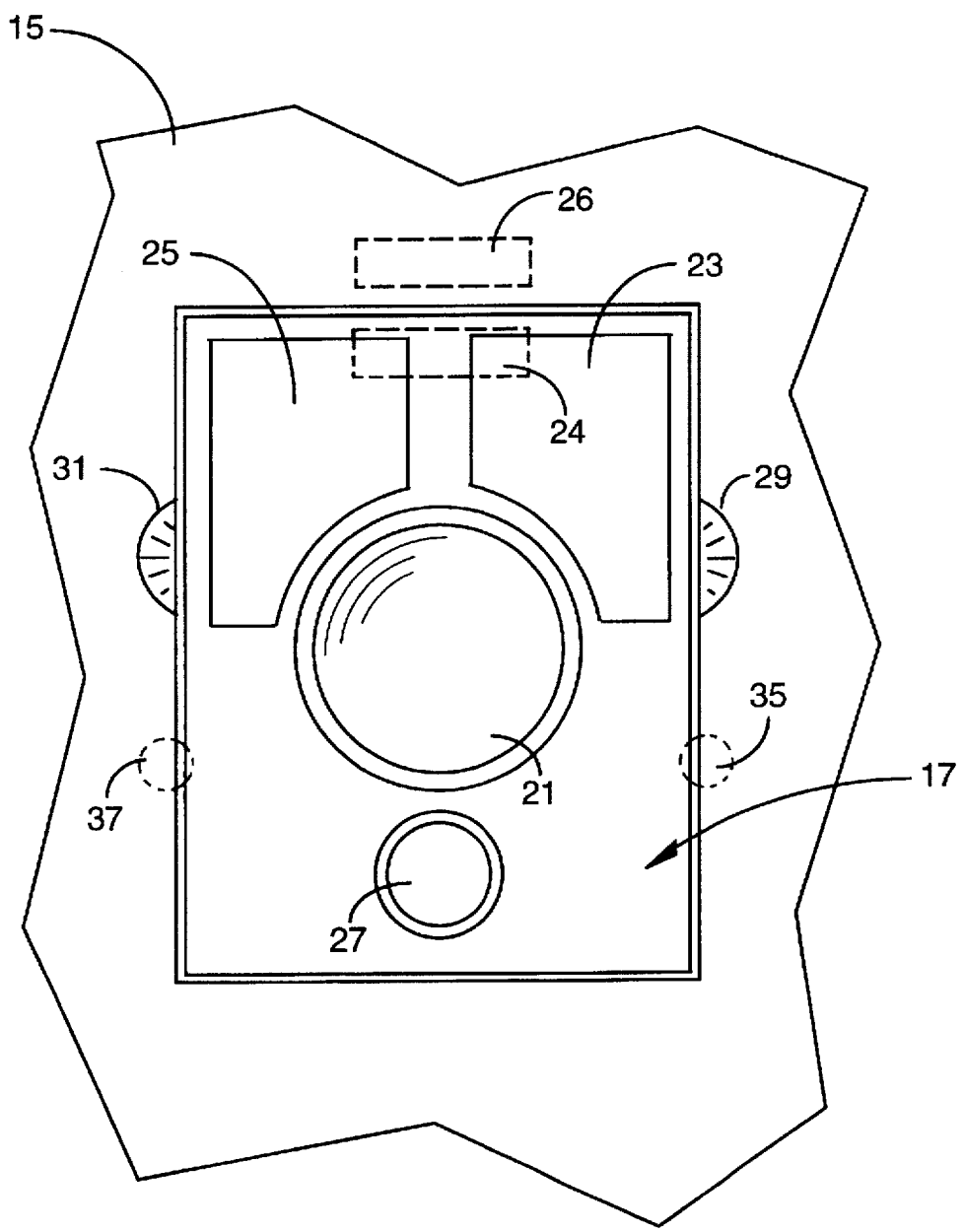
FIG. 2 is a plan view of the removable pointer device of FIG. 1H and 1I, and surrounding areas of the host.

FIG. 2 is a plan view of removable pointer device 17, showing LED transmitter 24 inside the device facing photodiode receiver 26 inside a wall of well 16. In the side walls of well 16, concave depressions 29 and 31 allow a user to grasp removable pointer device 17 and snap it in or out of well 16. The removable pointer device is held in place in this embodiment by light resistance provided by spring-loaded ball/detent pairs 35 and 37 on both sides of the device. Spring loading may originate from either the pointer device or in the wall of the well. Vertical guide rails along the well walls, not shown in FIG. 2, allow detents 35 and 37 to slide smoothly into the well and snap into place once seated. The method of docking and latching a removable pointer device into a location in the computer host is not limited to the description for this embodiment. There are known in the art many other equivalent ways that can satisfactorily perform such a function. For instance, instead of the pointer device being seated squarely in the well, the device can be inserted at a slant into the well and snapped down into a spring-loaded base. The device can be released by the user pressing an indentation near the base of the device. Another variation is for the well to open to the front of the housing so the pointer device can slide in and out on guide rails. Spring-loaded detents along the sides hold the device in place while it is docked in this embodiment.

Figure 3:
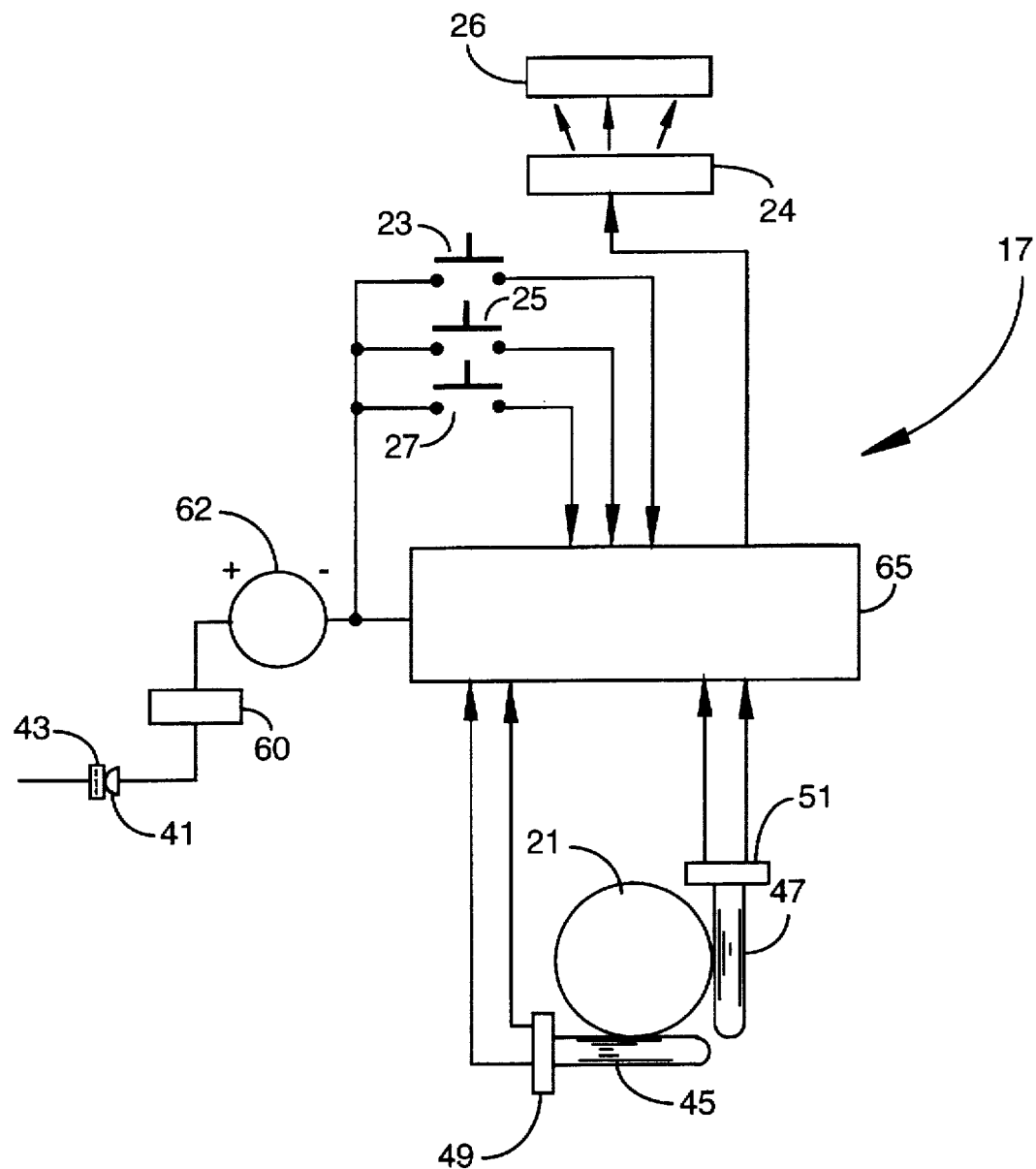
FIG. 3 is a mostly diagrammatic representation of internal components of the removable pointer device of FIGS. 1H, 1I and 2.

FIG. 3 is a mostly diagrammatic representation of the internal components of removable pointer device 17 for the embodiment described for FIGS. 1 and 2. Two rollers, 45 and 47, are mounted at right angles and bear against trackball 21. As trackball 21 rotates, roller 45 responds to movements in a first direction and roller 47 senses movements at 90° to the first direction. The rollers are connected to encoder wheels 49 and 51, which transmit signals relative to movement to controller 65.

Removable pointer device 17 is powered by a battery 62 that is rechargeable in this embodiment by charger circuit 60 when the pointer device is seated in well 16. Battery charger 60 receives electrical current from the computer host through a spring-loaded contact base, or any other suitable type of charging contact. In this embodiment a spring wiper contact 43 is located on one side of the well and a fixed contact 41 is on the side of the pointer. Contacts are well known in the art and there are many equivalent ways that such a contact can be configured. For example, in other embodiments there may be a female connector on the bottom of the pointer device that plugs into a male connector in the bottom of the host well. Such an arrangement not only serves as an electrical contact, but also holds the pointer device in the well, minimizing or eliminating the need for detents. Signals produced from the trackball's motion are converted to infrared signals by microprocessor-based controller 65 and output through LED transmitter 24 to photodiode receiver 26 in the well wall, or if the pointer is being used outside the well, photo diode receiver 33 on the front side of the housing as shown in FIG. 1. Input signals from control buttons 23, 25, and 27 are also processed by controller 65.

Figure 4:
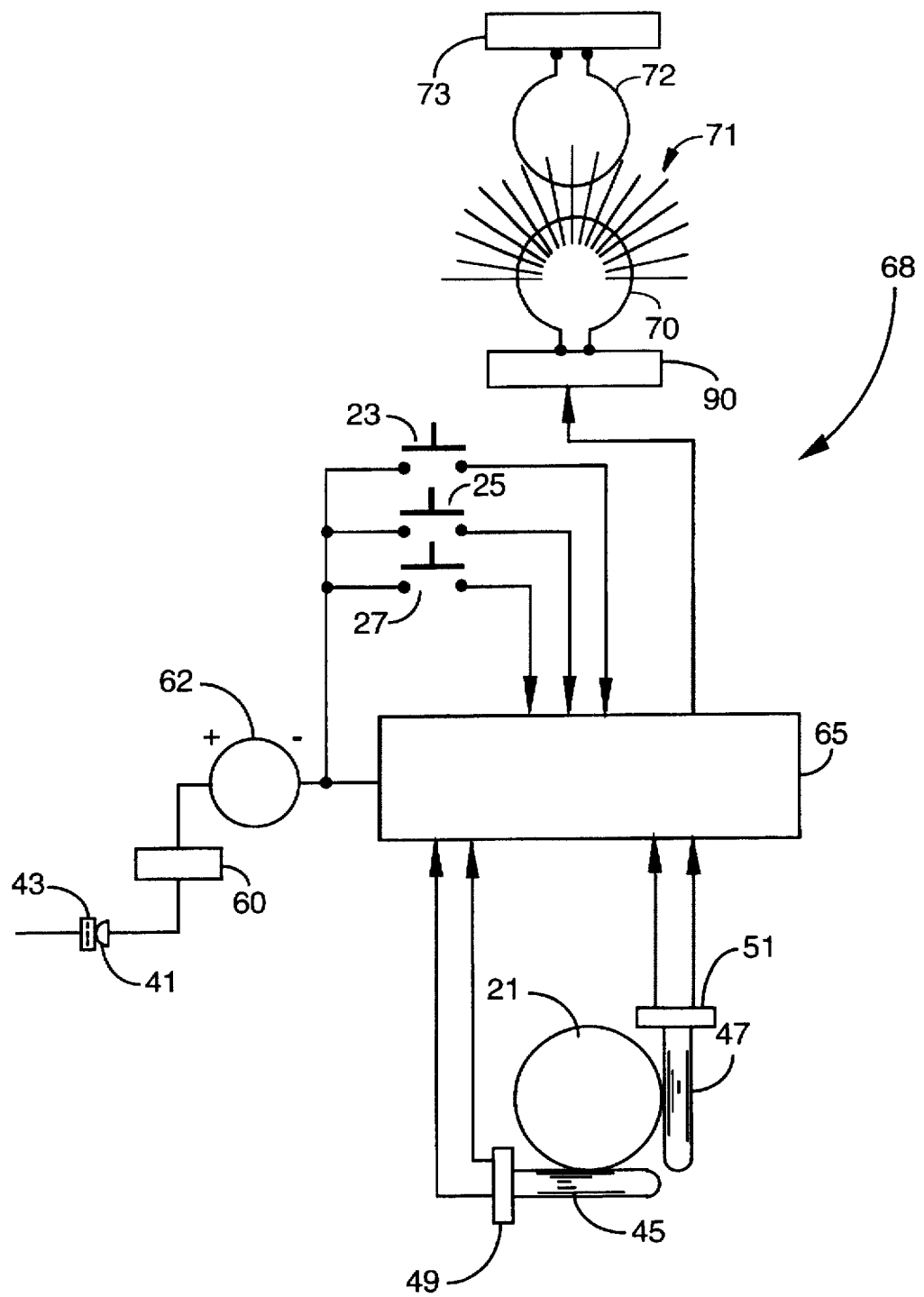
FIG. 4 is a mostly diagrammatic representation of internal components of a removable pointer device according to an alternative embodiment of the present invention.

FIG. 4 is a mostly diagrammatic representation of the internal components of a cordless removable pointer device 68 in an alternative embodiment that uses magnetic induction as the medium of communication between pointer device and host. All electromechanical components in FIG. 4 are the same as those described for the FIG. 3 configuration except electrical signals from the encoders and control buttons are input by a microprocessor-based current controller 90, which passes the current through a one-turn generator loop 70, creating a magnetic field represented by exemplary field lines 71. Receiving loop 72, which is located in the host housing, transmits a magnetically induced current to a demodulator 73, which forwards the coded signal to a controller.

There are a number of equivalent ways a receiving apparatus may be configured for reception by magnetic induction. For example, such an apparatus might be built into the case of the host computer, or implemented on an add-on printed circuit board. Also, FIG. 4 is largely diagrammatical, as stated above, and the transmission and receptor loops are not drawn to actual size relative to other components. In general, both loops are much larger than shown, and there may be more than a single turn in some embodiments.

In another embodiment of the invention, a cordless unit is provided having both stationary and portable mode features as described above relative to FIG. 1, and configured to operate both as a trackball and a mouse device. In this embodiment one side of the combined removable pointer device is a typical trackball unit and when the device is turned over, it may be used as a mouse. Operating mode is selected by a switch on the side of the device.

Figure 5A:
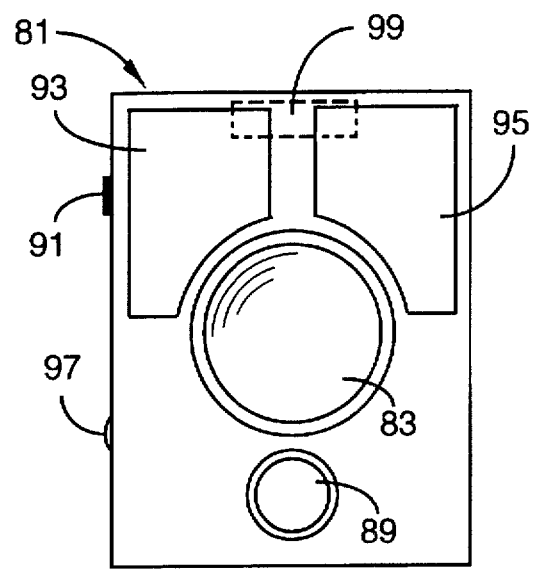
FIG. 5A is a plan view of a combined removable pointer device according to an alternative embodiment of the present invention.

FIG. 5A is a plan view of a combined removable pointer device 81. Pointer device 81 comprises on the surface shown in FIG. 5A all the elements described for a trackball unit in the embodiment of FIGS. 1 and 2, with the addition of an operating mode switch 91 on one side. The user moves switch 91 to select between trackball and mouse operation. Trackball 83, control buttons 93, 95, and 89, LED transmitter 99, and charging intact 97 are located in the same positions as are their counterparts in the removable trackball of FIGS. 1 and 2.

Figure 5B:
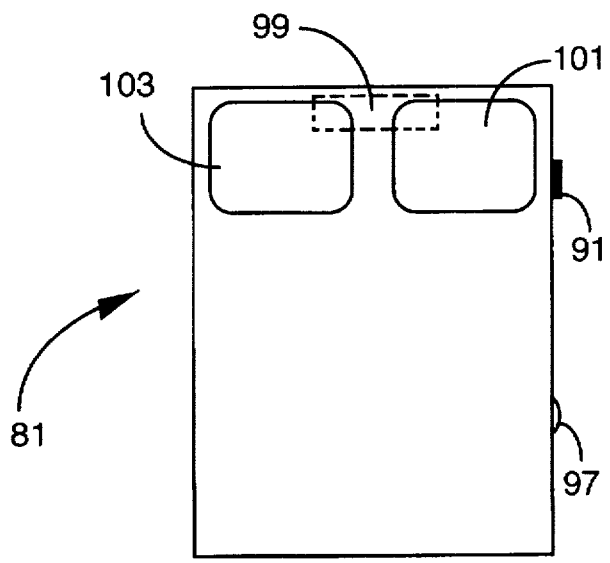
FIG. 5B is a plan view of the pointer device of FIG. 5A, showing the opposite side.

FIG. 5B is a plan view of the opposite side of combined removable pointer device 81. In this embodiment, control buttons 101 and 103 are flush with the outside surface of the body of the pointer device, so when used as a trackball, the device can sit squarely on a desktop surface or in its well. In a conventional trackball device, the rotator ball is not loosely mounted like that on a mouse so the ball does not naturally fall to the desktop surface when the unit is inverted. This problem is solved in the present embodiment by the relationship between the height of protrusion of the three pushbuttons on the side of trackball 21, and the height of protrusion of the trackball.

Figure 5C:
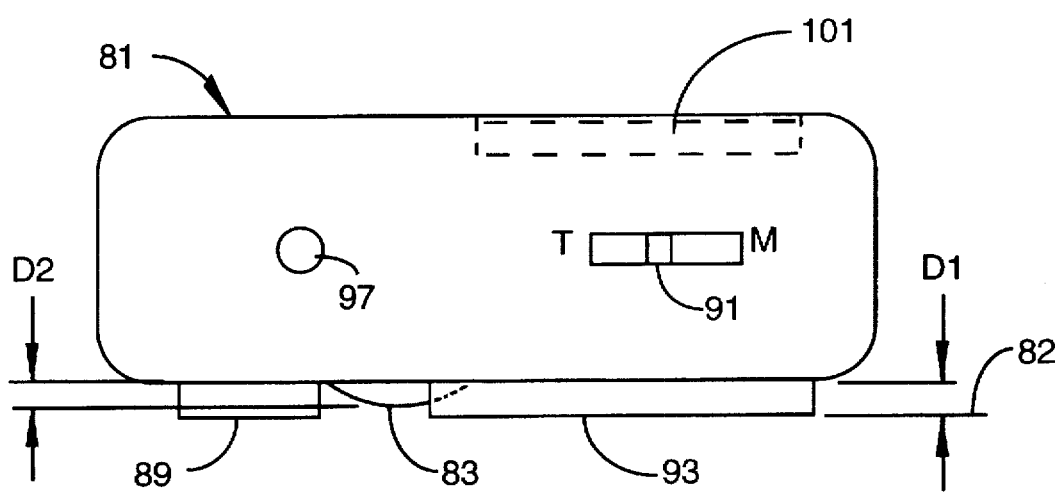
FIG. 5C is an elevation view of a combined removable pointer device according to an alternative embodiment of the present invention.

FIG. 5C shows combination pointer device 81 in contact with a flat surface 82. Dimension D1 from the casing to the outer surface of any of the control buttons is greater than dimension D2 from the unit casing to the trackball. Slight pressure exerted on the unit causes spring-loaded control buttons 89, 93, and 95 to depress bringing ball 83 into contact with surface 82, so lateral movement will cause the ball to rotate.

The phenomenon of riding on the spring-loaded buttons provides a new aspect of control in operating the pointer device as a mouse. For example, in the often-occurring situation with a mouse where surface area available for mouse operations is limited, the mouse often has to be picked up and repositioned on the operating surface. Picking up the mouse so the ball does not touch the operating surface insures that position signals are not transmitted while the mouse is repositioned. With a mouse according to this embodiment of the present invention, the mouse can be repositioned simply by relaxing the slight downward pressure necessary to cause the ball to contact the operating surface. This seems at first encounter to be a small difference, but translates to considerable advantage, especially in situations where the available operating surface is severely limited.

Figure 5D:
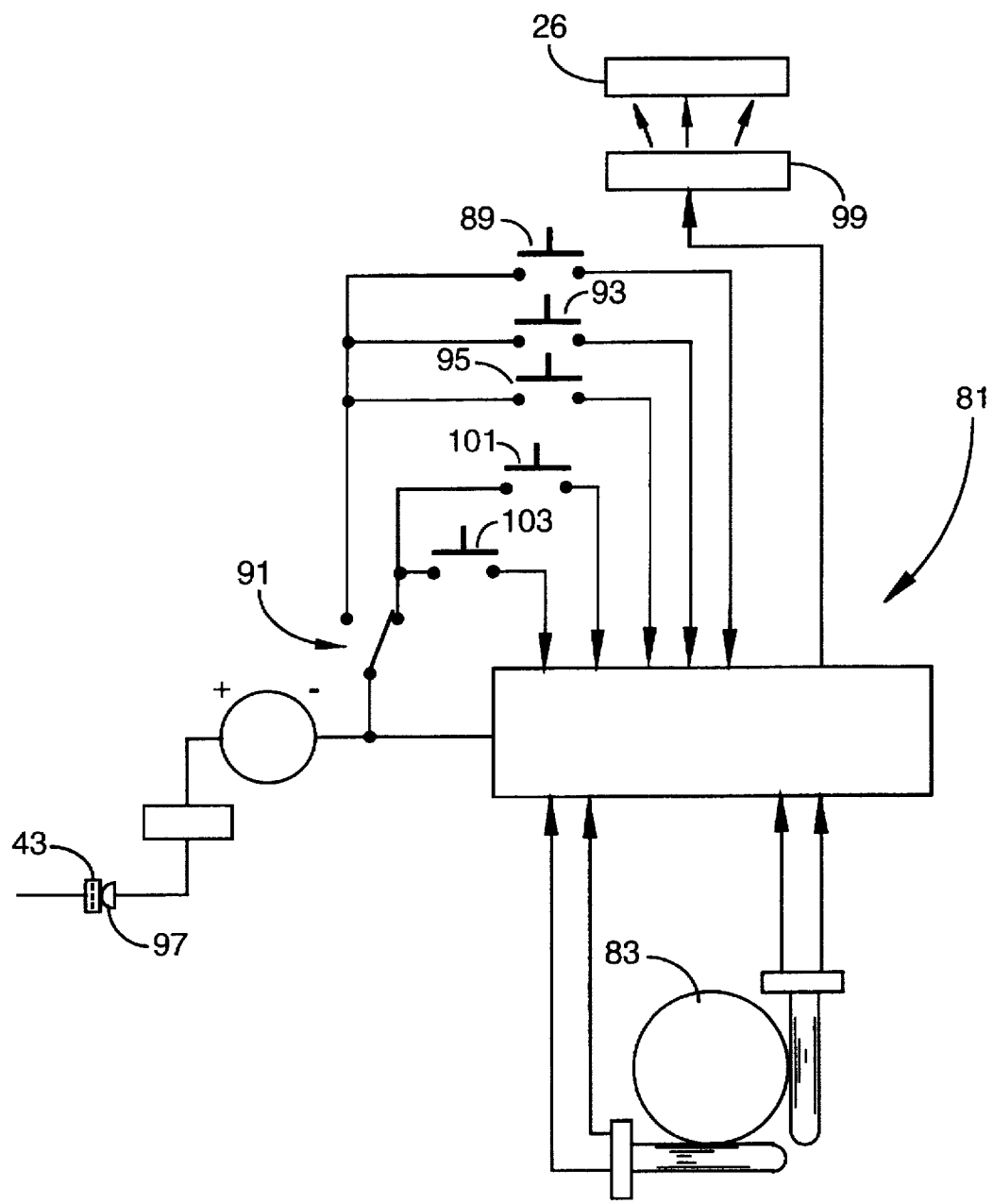
FIG. 5D is a mostly diagrammatic representation of the internal components of the combined removable pointer device of FIG. 5C.

FIG. 5D is a mostly diagrammatic view of the internal components of combined removable device 81. Internally the trackball and mouse input components share circuitry as shown for the removable pointer device embodiment in FIG. 3, with the addition of operating mode switch 91 and control buttons 101 and 103.

Figure 6A:
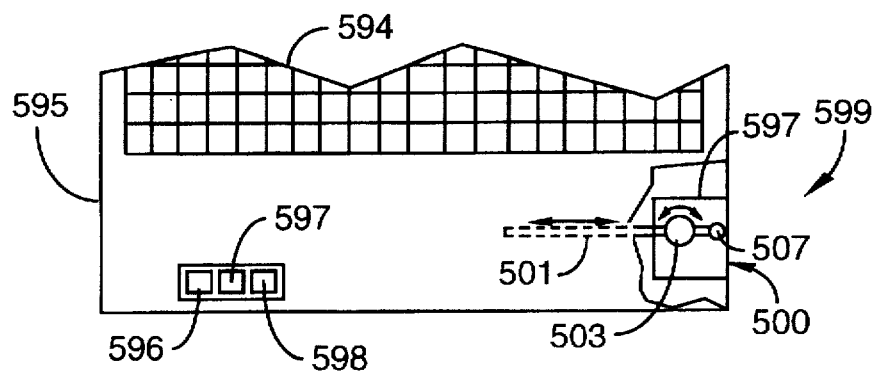
FIG. 6A is a plan view of a polar-coordinate pointer device stored in a compartment in a host computer according to an alternative embodiment of the present invention.

In alternative embodiments, either a removable trackball device or a combined trackball-mouse device as described above may be connected to the host unit by a power cable. There are many ways a cable connection might be implemented for using such devices while removed from the well on the host. For example, at some point on the case of the host computer a small bay may have a cable electrically connected to the host bus and the cable wound on a small reel with a connector on the outward end for connecting to the pointer device when removed from the well. There are many equivalent ways a cable connection might be implemented. In an alternative embodiment, a pointer device sends polar coordinate location signals in response to movements made by a mechanically attached, extendable positional input bar. FIG. 6A is a plan view of such a polar coordinate pointer device 99 stored in unextended form inside a compartment 97 in host housing 95. Positional input bar 101, which passes through a sensored pivot 103, can be extended from opening 100 by the user pulling handle 107. A preferred location for the device for a right-handed person is on the right side of the housing that contains keyboard 94, but it could be located in any other place as well, such as on the left side for left-handed users. Operational control buttons 96, 97, and 98 of the type typically used to control discrete pointer signalling, are located in another area of housing 95 in this embodiment, such as on the left front side.

Figure 6B:
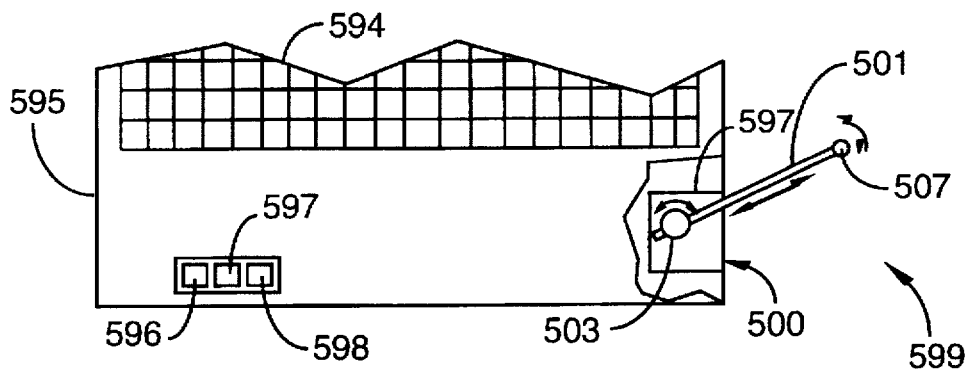
FIG. 6B is a plan view of the polar-coordinate pointer device of FIG. 6A, with the pointer device extended for use.

FIG. 6B is a plan view of polar coordinate pointer device 99 in extended operating position. Positional input bar 101 can be held by handle 107 and freely moved in a horizontal plane over an area adjacent to the computer housing. A stop near the inboard end of positional input bar 101 limits the maximum distance the bar can be extended. On the outboard end of positional input bar 101, a pivoted handle 107 is attached by a vertical pin. Such a handle could have any of a number of different shapes.

In one embodiment, grooved channels (not shown) along the length of the input bar engage mating guides in the pivot to prevent rotation of the bar around the longitudinal axis. There are a number of equivalent ways the engagement and guiding function may be accomplished.

Sensors at pivot 103 (not shown), track radial displacement of positional input bar 101. Other sensors (not shown) track rotation of the pivot mechanism, which is the angular displacement of positional input bar 101. There are a number of types and arrangements of bar guides and sensors that would be suitable. Sensor information is transformed from polar coordinates to cartesian coordinates, and used as pointer input in the same fashion that trackball or mouse positional input is used. Input from control buttons 96, 97, and 98 in FIG. 6A, is interpreted just as control button input from a trackball or mouse device.

Figure 6C:
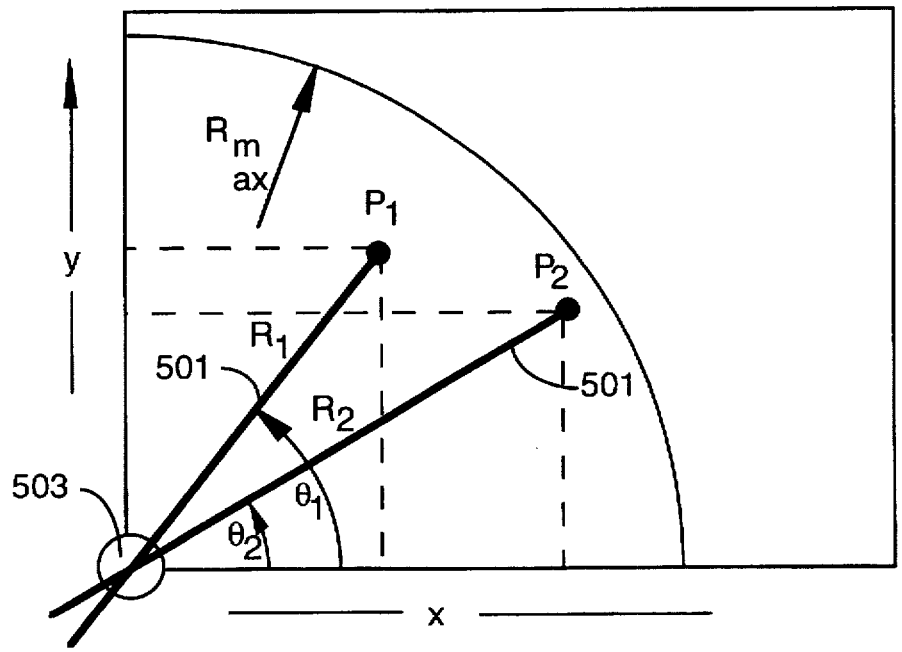
FIG. 6C is a graphic illustration of the geometry involved in the calculation of the cartesian of the polar- coordinate pointer device in FIG. 6B.

FIG. 6C is a graphic illustration of the geometry involved in the transformation of displacement measurements of positional input bar 101 from R, Θ polar coordinates to x,y rectangular coordinates that can be used for screen cursor output. In FIG. 6C, points $P_1$ and $P_2$ represent two x,y positions of pivoted handle 107 on positional input bar 101 measured from pivot 103 at $P_0$. Point $P_1$ is at radial distance $R_1$ and angle $\Theta_1$ from $P_0$; point $P_2$ is at radial distance $R_2$ and angle $\Theta_2$ from $P_0$. The maximum radial distance, $R_{max}$, the bar can be displaced is shown as a circular arc. Through transformation equations, $x=R \cos \Theta$ and $y=R \sin \Theta$, x,y positions of both $P_1$ and $P_2$ points can be calculated.

There are a number of variations to the pointer described with reference to FIGS. 6A, 6B, and 6C. For example, the pivot mechanism, bar, and handle could all be a part of a mechanism dockable in the computer case, and removable as a unit to be placed external to the computer and operated. In this alternative, the removable unit could be connected to the host by a cable, or could communicate by infra-red or inductive techniques.

Figure 7B:
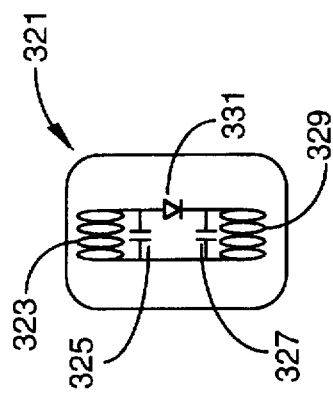
FIG. 7B is a plan view of the broadcast pointer device of FIG. 7A with the deployable element deployed.
Figure 7D:
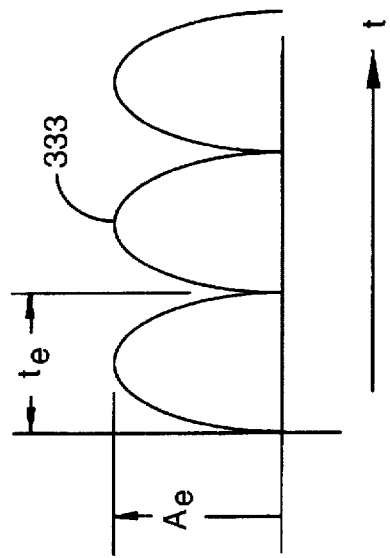
FIG. 7D is an illustration of a waveform as received by antenna 319 from pointer 321.
Figure 7A:
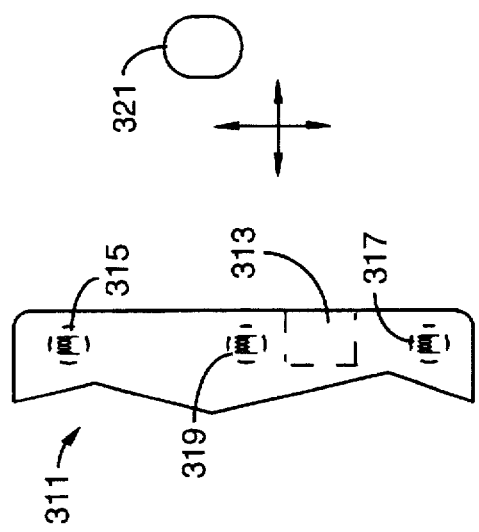
FIG. 7A is a plan view of a broadcast pointer system with a deployable element and a storage compartment according to an alternative embodiment of the present invention.

FIG. 7A is a plan view of yet another alternative embodiment of the present invention, wherein a removable, cordless, pointer receives broadcast signals from multiple antennas in or on the host, and echos the signals to a receiver in the host in a manner that allows control circuitry to track the position of the moving pointer. The tracked position of the movable pointer is used in the manner that pointer input from other types of pointers is used.

FIG. 7A shows one edge of a body 311 of a host computer, having a storage compartment 313 and three antennas 315, 317, and 319. A movable pointer device 321 is storable in a compartment 313 when not in use, and may be removed and deployed, as shown in FIG. 7A, for use.

FIG. 7B is a schematic of internal elements of device 321, showing a rectifier circuit of two antennas 323 and 329 connected with capacitors 325 and 327, and a diode 331. In operation in this particular embodiment, antennas 315 and 317 in the host are sending antennas, and antenna 319 in the host is a receiving antenna.

In one mode of operation, a carrier wave of a common frequency and amplitude is broadcast by each of sending antennas 315 and 317, but the signals are broadcast at a pre-programmed phase shift. The rectifier circuit in the pointer device intercepts the broadcast signals, combines (sums) them, and echoes a rectified waveform having a frequency known in the radio arts as the Hull frequency. This signal is received at antenna 319, where connected circuitry analyzes the signal to determine the position of the pointer relative to the broadcast and receiving antennas.

The receiving antenna intercepts both the original broadcast signals as well as the echoed signal, but the broadcast signals are at a much higher and known frequency than the echoed signal, and are filtered. FIG. 7D is a simplified illustration of an echoed signal 333 at receiving antenna 319.

Echoed signal 333 exhibits an amplitude $A_e$ and a frequency ($1/t_e$) that are indicative of the position of the pointer device. The amplitude is a function of the ratio of the distances to the pointer from each of the sending antennas, providing a locus, and the position on the locus is fixed by the frequency. The radio principles to relied upon for the broadcast cursor are well known in the radio arts, and are no more detailed explanation is presented here.

The information contained in the echoed signal is sufficient to locate the position of the pointer device near the host in essentially real time, and circuitry to provide this information to the host computing elements in a manner to control a display cursor and the like, is well known.

Figure 7C:
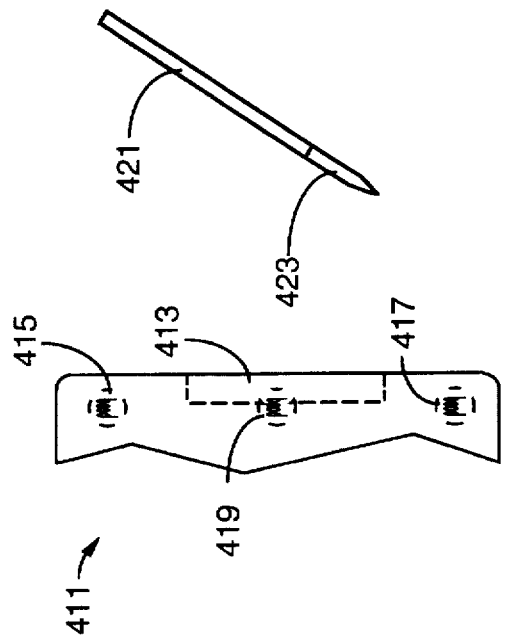
FIG. 7C is a plan view of another broadcast pointer system with a stylus-type deployable element.

FIG. 7C shows a broadcast pointer system comprising a host 411, and three antennas 415, 417, and 419, similar to that shown in FIG. 7A, wherein a stylus 421 is employed rather than a mouse-type pointer. In this embodiment the rectifier circuitry shown in FIG. 7B is implemented in a region 423 near the point of the stylus. The stylus embodiment operates in the same manner as does the mouse-type pointer described above, except the holding and manipulating of the pointer is in the manner of wielding a pen or a pencil, rather than a mouse. This embodiment provides a convenient way to input cursive writing and printing to the host computer. With appropriate circuitry monitoring and interpreting stylus movement, one may duplicate the functions of a pen-based input system. When not in use, stylus 421 resides in a compartment 413 in the host.

FIG. 7E shows another embodiment of the present invention using a stylus sleeve 425 as an alternative to stylus 421. Stylus sleeve 425 in a preferred embodiment is made of synthetic rubber, elasticized plastic, or the like, and can be affixed to many types of conventional writing instruments or other similar instruments.

Stylus sleeve 425 comprises a tubular section 422, a rectifier section 424, and rectifier circuitry 321. Tubular section 422 is made from a flexible material, as described above, which is form retentive and provides for the insertion of many types of writing or other similar instruments through its inner diameter. The elasticity and the surface tension of tubular section 422 material holds stylus sleeve 425 firmly in place on a stylus, pencil, pen, or other suitable instrument. Rectifier section 424 provides for encapsulating rectifier circuitry 321. Rectifier circuitry 321 provides for radio signal referencing with a host computer, as is described above for the embodiments described with reference to FIGS. 7A, 7B, 7C, and 7D.

FIG. 7F is a transparent view of stylus sleeve 425 over, and near the point of, a writing instrument 418. Rectifier circuitry 321 is shown encapsulated in rectifier section.

FIG. 7G shows stylus sleeve 425 affixed over and held firmly in place near the point of a writing instrument 418. Stylus sleeve 425 permits any type of conventional writing or similar instrument to operate in the same manner as does the mouse-type device described above, except the holding and manipulating of the pointer device is in the manner of wielding a pen or a pencil, rather than a mouse. Stylus sleeve 425 works with the same broadcast system 423 shown in FIG. 7C. This embodiment, however, provides a useful alternative to the stylus 421 (FIG. 7C.) in that any convenient device, such as a pen, pencil, or other similar instrument, can be used to input movement for cursor positioning on a display, cursive writing, printing, and drawing elements to the host computer. A user simply mounts stylus sleeve 425 over a writing or similar instrument, and begins pointer operations. With appropriate circuitry monitoring and interpreting stylus sleeve 425 movement, one may duplicate the functions of a pen or pencil-based input system. When not in use, stylus sleeve 425 resides in a compartment 413 in the host. In some embodiments the carrier stylus or writing instrument may be stored in the compartment with sleeve 425 in place.

Removable devices according to various embodiments of the present invention are particularly applicable to notebook and subnotebook computers. Such devices are not limited to portable computers, however. A removable device as described in the several embodiments above may also be implemented in a keyboard usable with a host computer, such as a desktop or workstation computer, including terminals designed to be used as nodes on a network.

Figure 8:
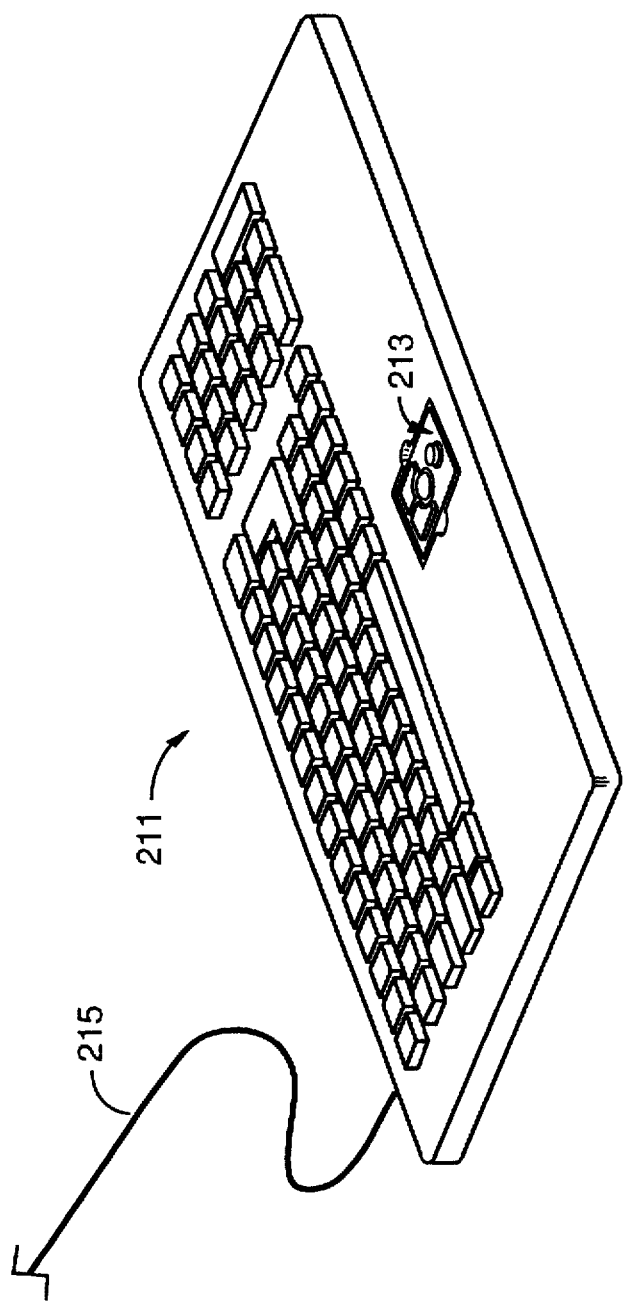
FIG. 8 is an isometric view of a keyboard having a removable pointer device according to a preferred embodiment of the present invention.

FIG. 8 is an isometric view of a keyboard 211 having a removable device 213 according to an embodiment of the invention described above with reference to FIGS. 1A and 1B. Keyboard 211 in this embodiment has a cable 215 for attaching to a host, and communicating both keystroke and data to the host, but may also be implemented with a keyboard that communicates in another manner with the host, such as by infrared signals or by inductance coupling.

In various embodiments of keyboards any and all of the embodiments described above relative to a host notebook-type computer may be implemented. In the case of a keyboard, it is usual to have a keyboard controller for coding keystroke data and imparting the data to the host. In the case of a removable device in a keyboard, the movement data is received by the keyboard controller and coded and passed to the host along with (multiplexed with) the keystroke data.

It will be apparent to one skilled in the art that there are a relatively large number of changes that may be made in the embodiments described without departing from the spirit and scope of the present invention. Some additions and alternatives have been mentioned above. Different embodiments, for example, can be rendered in different shapes and sizes, and there are many ways known for providing the needed electrical connections and for transmitting signals.

In the case of the echo device for a broadcast pointer system described with the aid of FIGS. 7E, F, and G, there are a number of different ways the echo device may be formed, and a number of different ways the body may be formed and engagement with a stylus or writing instrument may be accomplished. The embodiment described, with a flexible body having a bore is but one alternative within the spirit and scope of the invention.

What is claimed is:

1. An echo device for a broadcast pointer system for a computer, the echo device comprising:

a body having an engagement element for attaching to a separate instrument; and an antenna assembly mounted to the body, wherein the antenna assembly comprises:
a first loop antenna having a first and a second end;
a second loop antenna having a third and a fourth end; and
a diode;

wherein the first and second loop antennas are joined with the first end connected directly to the third end and the second end connected to the fourth end through the diode.

2. An echo device as in claim 1 wherein the body is formed of flexible material, and the engagement element is an opening of circular cross-section adapted for mounting the echo device to an instrument having the form of a stylus, a pencil, or a pen.

3. A broadcast pointer system comprising:

a pair of broadcast antenna in a computer housing configured to broadcast a carrier waveform at a common frequency but at a known phase difference;

a receiving antenna in the computer housing configured to receive an echo of the summed waveforms broadcast by the pair of broadcast antennas;

circuitry in the computer housing connected to the receiving antenna and configured for analyzing the received waveform and determining the position of the pointer from waveform characteristics; and a rectifier circuit comprising two antenna connected through a diode;

wherein the rectifier circuit is mounted in a body having an engagement element for mounting the body to a separate instrument.

4. A broadcast pointer system as in claim 3 wherein the body is formed of flexible material, and the engagement element is an opening of circular cross-section adapted for mounting the echo device to an instrument having the form of a stylus, a pencil, or a pen.

5. A method for adapting a stylus, pen, or pencil to be a pointer device in a broadcast pointer system for a computer adapted for tracking a pointer device by broadcasting signals and receiving echoes from the broadcast signals, the method comprising:

(a) forming an echo device for the broadcast pointer system in a body having an engagement element for mounting the echo device to the stylus, pen, or pencil, the echo device having a first loop antenna having a first and a second end; a second loop antenna having a third and a fourth end, and a diode, wherein the first and second loop antennas are joined with the first end connected directly to the third end and the second end connected to the fourth end through the diode; and (b) mounting the echo device to the stylus, pen, or pencil.

6. The method of claim 5 wherein the body is formed of flexible material, and the engagement element is an opening of circular cross-section adapted for mounting the echo device to the stylus, pen, or pencil.

* * * * *